United States Patent [19]

Swann

[11] Patent Number: 4,962,988

[45] Date of Patent: Oct. 16, 1990

[54] TERMINATION INTERFACE STRUCTURE AND METHOD FOR JOINING AN OPTICAL FIBER TO A GRADED INDEX ROD LENS

[75] Inventor: Thomas A. Swann, Espanola, N. Mex.

[73] Assignee: Optomec Design Company, Santa Fe, N. Mex.

[21] Appl. No.: 377,469

[22] Filed: Jul. 10, 1989

[51] Int. Cl.⁵ .............................................. G02B 6/32
[52] U.S. Cl. .............................. 350/96.18; 350/96.21; 350/320
[58] Field of Search ............... 350/96.15, 96.16, 96.18, 350/96.20, 96.21, 320, 413

[56] References Cited

U.S. PATENT DOCUMENTS

| | | | |
|---|---|---|---|
| 3,801,181 | 4/1974 | Kitano et al. | 350/413 X |
| 4,268,112 | 5/1981 | Peterson | 350/96.18 |
| 4,290,667 | 9/1981 | Chown | 350/96.18 |
| 4,490,020 | 12/1984 | Sakaguchi et al. | 350/96.18 |
| 4,575,194 | 3/1986 | Streifer et al. | 350/413 |
| 4,701,011 | 10/1987 | Emkey et al. | 350/96.18 |

FOREIGN PATENT DOCUMENTS 57-133429 8/1982 Japan ................................ 350/96.18

*Primary Examiner*—John D. Lee
*Attorney, Agent, or Firm*—Frishauf, Holtz, Goodman & Woodward

[57] ABSTRACT

In order to make possible the provision of a good fusion joint with low losses between an optical fiber and a graded index (GRIN) glass rod lens with considerably larger diameter, the end of the GRIN lens to which the optical fiber is to be joined is tapered down radially the extent of at least one third the radius of the cylindrical lens at an angle approximately 45°. It is then possible to make a mechanically good fused joint with low transmission losses in the mid portion of the reduced-diameter end of the lens by heating the butt joint with an electric arc. The taper may be frusto-conical, convex or concave.

9 Claims, 4 Drawing Sheets

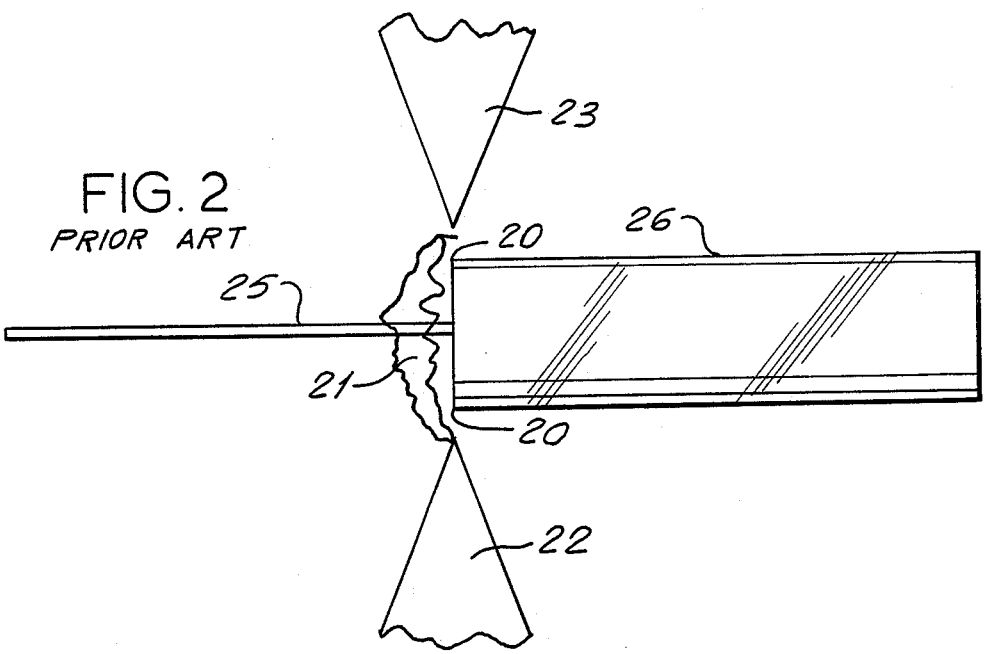
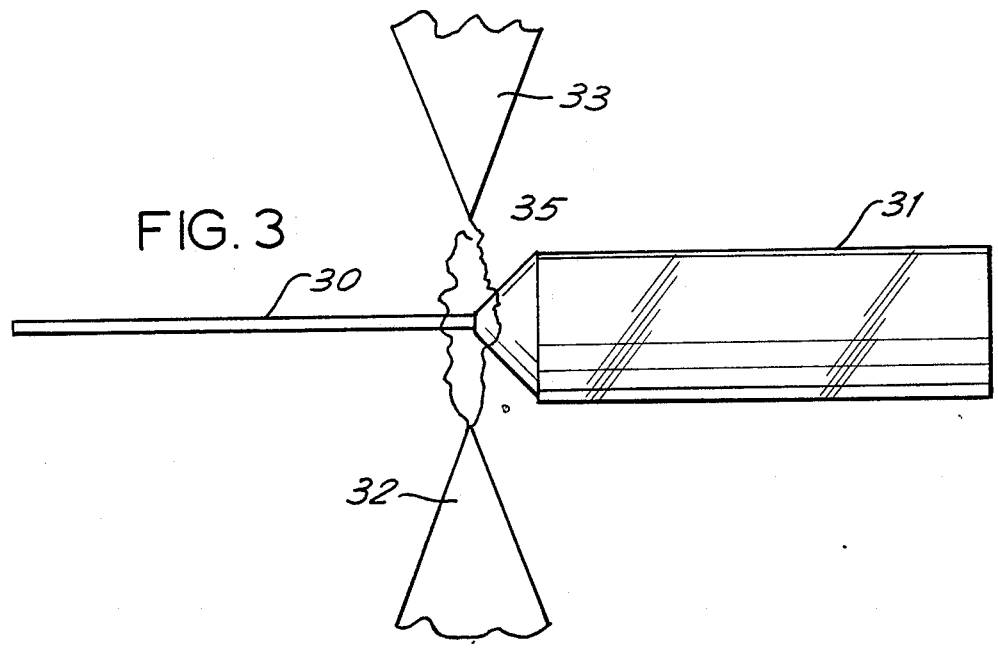

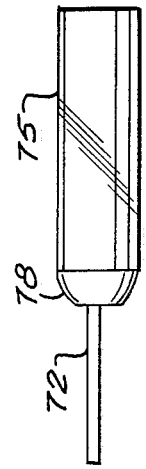
FIG.7a
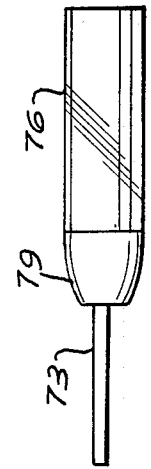
FIG.7b
FIG.7c
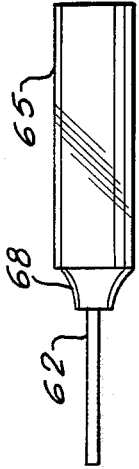
FIG.6a
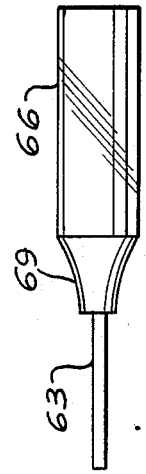
FIG.6b
FIG.6c
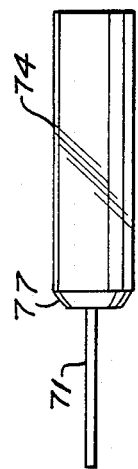
FIG.5a
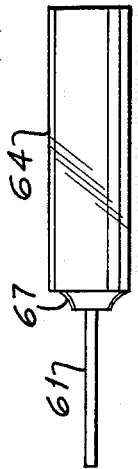
FIG.5b
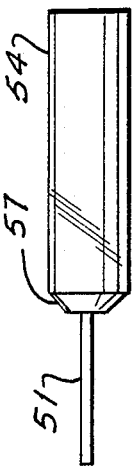
FIG.5c

TERMINATION INTERFACE STRUCTURE AND METHOD FOR JOINING AN OPTICAL FIBER TO A GRADED INDEX ROD LENS

This invention was made with Government support under Contract No. N66001-87-C-0415 awarded by the U.S. Department of the Navy. The Government has certain rights in this invention.

This invention concerns a method of fusion bonding of optical fibers to graded index (GRIN) rod lenses.

In order to make direct joints in optical fiber circuits, very precise alignment of the fibers to be joined is needed, so that good transmission at the joint is attained Providing detachable connectors involves the same problem and of course cannot achieve the alignment tolerances possible with a permanent fused or bonded joint.

A technique which has been used for terminating optical fibers in a way that would furnish practical connections or couplings involves attaching a cylindrical graded index (GRIN) rod lens to the end of the optical fiber, so that light propagating out of the optical fiber, instead of diverging outwards, would be collimated by the GRIN rod lens into a beam of uniform diameter. A similar coaxial structure on the end of another optical fiber would receive the collimated light and focus it into the second optical fiber. The interface between the GRIN lenses does not require mechanical connection and introduces only small transmission losses.

The GRIN lens in general is of a glass composition that can be fused to the optical fiber to which it needs to be attached. Although the fusing of two optical fibers together has been done successfully heretofore, the fusing of a fiber to a GRIN lens of considerably larger diameter than the fiber diameter has not heretofore been successful because of the thermal mass mismatch between the small diameter fiber and the relatively large diameter lens.

As a result it has become conventional to attach optical fibers to GRIN lenses by means of adhesives. This raises two basic problems. First, on curing of the adhesives, there is invariably some shrinkage or growth which results in some movement of the fiber with respect to the lens. Any misalignment results in an increase in signal loss through the joint. Secondly, adhesives have a relatively high coefficient of thermal expansion with respect to glass and this limits the useful temperature range over which the joints can be used without suffering unacceptable signal losses.

One proposal for avoiding the use of adhesives is disclosed in U.S. Pat. No. 4,701,011, where the GRIN lens is a multi-mode fiber having the same diameter as a single-mode fiber for which it provides a termination. This structure permits a fused connection instead of an adhesive joint, because it avoids the problem resulting from the thermal mass mismatch between the fiber and the rod lens.

The standard heat source for fusing optical fibers together is a high voltage arc formed between electrodes. In its use, the thermal mass mismatch between the small diameter fiber and the larger diameter lens shows up in too much heat from the arc going into the fiber and not enough heat into the GRIN lens and in the end edge of the cylindrical GRIN lens diverting the arc.

SUMMARY OF THE INVENTION

It is an object of the present invention to provide a method of fusing an optical fiber to the middle of an end surface of a GRIN rod lens without too much heat getting into the fiber and insufficient heat into the lens and to provide thereby a collimating/focusing termination of low transmission loss for an optical fiber while avoiding the problems associated with adhesives.

Briefly, a cylindrical GRIN glass rod lens of a length suitable for the necessary collimation, is tapered at the end thereof to which the optical fiber is to be fused on, the taper being axially symmetrical, extending over at least a third of the cross-section radius of the rod lens and over a length at least equal to the portion of the cross-section radius over which the taper extends, thus leaving a central transverse plane end surface, to the mid-portion of which an optical fiber may be fused. A fused butt joint can then be made because an electric arc will not be disturbed by cylindrical edges of a rod lens and the heat of the arc which is used to fuse the fiber to the end of the lens will heat the end of the lens more effectively, and the end of the optical fiber will not be overheated. The resulting fused butt joint is mechanically stable and provides low transmission loss between the optical fiber and the lens.

The plane end surface to which the fiber is fused can have a diameter up to 50% of the diameter of the optical fiber without resulting in overheating of the optical fiber and underheating the end surface of the lens to an undesirable extent.

The profile of the tapered portion of the lens can be frustoconical, convex or concave.

Normally the face of the lens opposite the end which is fused to the optical fiber would be plane and perpendicular to the axis of the lens, but it is conceivable that the lens might have a small concave or convex profile contributing to the collimation at the expense of a change in the length of the lens, or perhaps adding an effect needed for coupling with some optical device. In other words, the invention concerns the end of the lens to which the optical fiber is fused and the other end may be varied to suit the particular kind of termination of the optical fiber that may be desired, although it will usually be expected that a plane termination from which a collimated beam issues or into which a collimated beam enters would be desired.

BRIEF DESCRIPTION OF THE DRAWINGS

The invention is further described by way of illustrative example with reference to the annexed drawings, in which:

FIG. 2 is a diagram of what happens when a fused joint is attempted in place of one of the adhesive joints shown in FIG. 1;

FIG. 3 is a diagram of the forming of a fused joint in accordance with the invention;

FIG. 4b is a photographic profile view profile of a fused joint made with the rod lens shown in FIG. 4a;

FIGS. 5a, 5b and 5c are diagrams of optical fiber terminations according to the invention using a frustoconical taper of the GRIN lens end to which the optical fiber is fused;

FIGS. 6a, 6b and 6c are diagrams of optical fiber terminations according to the invention utilizing concave tapers, and FIGS. 7a, 7b and 7c are diagrams of optical fiber terminations according to the invention in which convex tapers of the GRIN lens are used.

DESCRIPTION OF THE ILLUSTRATED EMBODIMENTS

Before practice of the invention is discussed, reference will be made to FIGS. 1 and 2 in order to illustrate the problem which is overcome by the invention.

Figure 1:
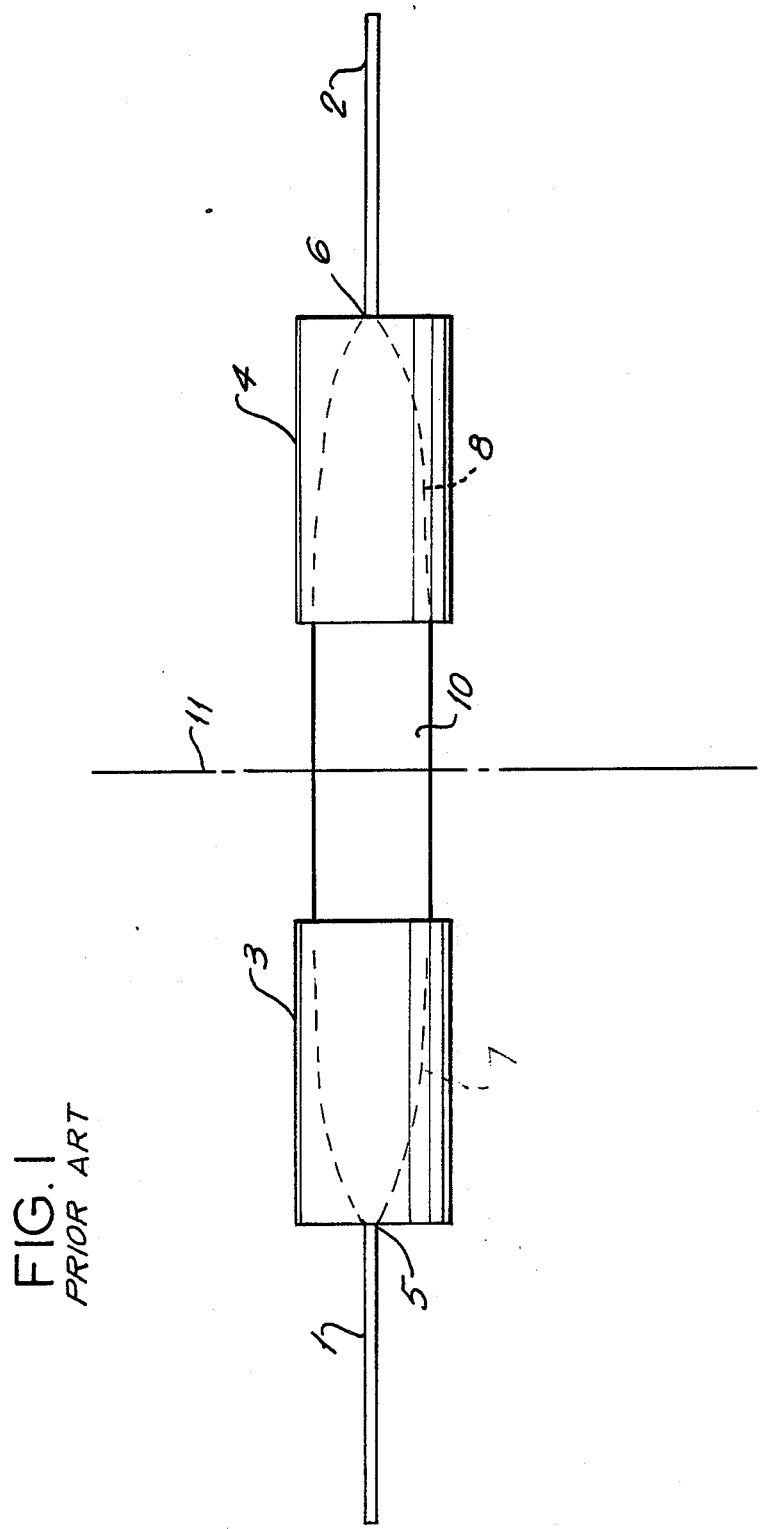
FIG. 1 is a diagram of a conventional GRIN lens coupling of two optical fibers.

FIG. 1 is a diagram showing a GRIN lens coupling connecting two optical fibers. It is assumed for the purpose of illustration that the fiber 1 is an input fiber and the fiber 2 is an output fiber, although the optical system works in both directions and light could be transmitted in either direction in the illustrated coupling. The collimating lens 3 is attached to the input fiber 1 by an adhesive joint 5 utlizing an epoxy adhesive. The envelope of the light beam being collimated by the lens 3 is shown by the broken line 7. The collimated light beam shown at 10 enters the focusing lens 4 to which the output fiber 2 is joined by an adhesive joint 6, again utilizing an epoxy adhesive. The envelope of the light beam in the lens 4 is shown by the broken lines 8. The center line 11 of the drawing shows an interface plane about which the disposition of the optical components is symmetrical. The distance between the lenses 3 and 4 is not critical and can be very small. In fact the lenses may be separably fitted together, if that is desired.

As mentioned before, the epoxy joints 5 and 6 produce a transmission loss and are otherwise troublesome FIG. 2 is a diagram of what happens when an electric arc such as is used to fuse two optical fibers end to end is used to fuse an optical fiber to a GRIN lens. The rectangular cylindrical edge 20 displaces the electric arc 21 between the electrodes 22 and 23, so that the fiber 25 is overheated and the lens 26 is insufficiently heated. The displacement of the arc is somewhat exaggerated in the illustration, but the effect depicted is nevertheless troublesome.

FIG. 3 illustrates the method of the invention and the resulting termination of an optical fiber 30 with a GRIN lens 31. The electrodes 32 and 33 are again positioned so that the line joining them passes through the joint, but because the end surface of the lens 31 has a bevel 35, the arc is not diverted, and the fiber 30 is not overheated, while the end of the lens 31 is sufficiently heated to produce a suitable joint.

Figure 4A:
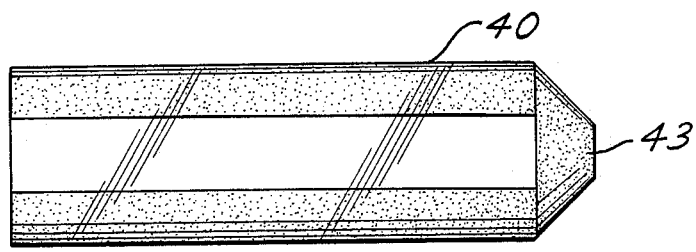
FIG. 4a is a photographic profile view of a rod lens ready for making a fused joint according to the invention.
Figure 4B:
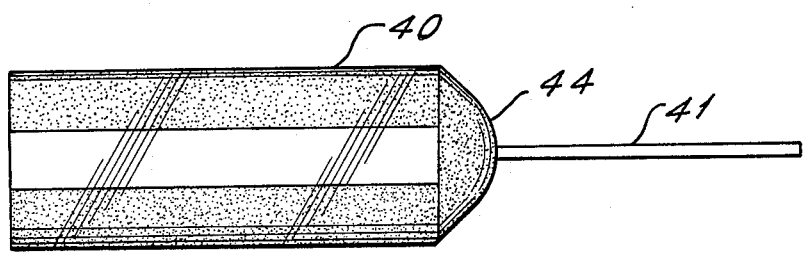

FIG. 4a shows a photographic profile of a GRIN lens 40 and FIG. 4b shows a photographic profile of the same lens after a fiber 41 has been fused to the center of the tip of the lens. The actual lens used in the photographic profiles, as an example, is a "Selfoc" GRIN lens from NSG America that is a ¼ pitch type, 1300 micron wavelength, 2.0 mm diameter and 16.3 mm long. The fiber is from Newport Corporation. It is a single-mode, 1300 micron type with a 8 micron core and 125 micron cladding. It will be seen that the fusing process has somewhat rounded the plane tip surface 43 of FIG. 4a to produce the tip profile 44 in FIG. 4b.

FIGS. 5a, 5b and 5c respectively show terminations of a fiber 51, 52, 53 by a fused-on GRIN lens 54, 55, 56. In FIG. 5a the beveled (frustoconical) portion 57 is short, in FIG. 5b the corresponding portion 58 is of medium length, and in FIG. 5c the corresponding portion 59 is relatively long. These are all suitable configurations. The length of the lens, of course, is determined by a particular graded index characteristic and is made sufficiently long to provide collimation for light issuing out from the optical fiber.

The heating of a small portion of the GRIN lens not only modifies the shape of the lens tip as shown in FIG. 4b, but also destroys the lensing effect in a small portion of the lens at its tip. It is therefore necessary to start with a lens slightly longer than would be used if the fiber were to be attached with an adhesive.

FIGS. 6a, 6b and 6c are like FIGS. 5a, 5b and 5c except for the fact that the tapered portion is concave. In FIGS. 6 and 7a, 7b and 7c, on the other hand, the tapered portion is convex.

I claim:

1. A termination interface structure for an optical fiber for interfacing said fiber with a collimated light beam comprising:

a cylindrical graded index (GRIN) glass rod lens of substantially circular cross-section and of a length suitable for collimation of light transmitted from said optical fiber and for focusing of collimated light transmitted to said optical fiber, said lens having a diameter measuring at least 500% of the diameter of said optical fiber, having a first end surface which is substantially plane, or of low axially symmetrical curvature, intersecting the circumferential surfaces of said rod lens and a second end surface which is tapered in axial symmetry by at least a third of the cross-section radius of said rod lens and over a length at least equal to the portion of the cross-section radius over which the taper extends, said taper leaving a central transverse end surface of said second end surface for connection to said optical fiber, and a fused butt joint joining an end of said optical fiber to said rod lens at said transverse end surface.

2. A termination interface structure for an optical fiber according to claim 1, wherein said transverse end surface has a diameter greater than said diameter of said optical fiber and said fused butt joint extends over only a mid-portion of said transverse end surface.

3. A termination interface structure for an optical fiber according to claim 2, wherein the radius of said central transverse end surface of said second end surface is between 20% and 66% of the radius of said rod lens.

4. A termination interface structure for an optical fiber according to claim 3, wherein the axial length of said tapered portion of said second end surface is not more than 33% of the length of the cylindrical portion of said lens.

5. A termination interface structure for an optical fiber according to claim 2, wherein said second end surface is tapered in frustoconical shape.

6. A termination interface structure for an optical fiber according to claim 2, wherein said second end surface is tapered convexly.

7. A termination interface structure for an optical fiber according to claim 2, wherein said second end surface is tapered concavely.

8. A method of joining an optical fiber to a graded index (GRIN) rod glass lens of diameter much greater than said fiber comprising the steps of:

selecting a graded index rod lens having one of its axial ends tapered by at least one third of the radial distance from the rod lens periphery to its axis and over a distance from said one of its axial ends at least equal to said radial distance by which said end is tapered, and fusing, by local heating to a glass-melting temperature, an end of said optical fiber to a spot of said tapered end of said rod lens, through which spot said axis of said lens passes.

9. A method according to claim 8, wherein said local heating is produced by an electric arc.

* * * * *